United States Patent [19]

Igata

[11] Patent Number: 4,945,524
[45] Date of Patent: Jul. 31, 1990

[54] COMPACT OPTICAL PICKUP APPARATUS FOR OPTICAL DISK PLAYER

[75] Inventor: Toyonori Igata, Tokorozawa, Japan

[73] Assignee: Pioneer Electronic Corporation, Tokyo, Japan

[21] Appl. No.: 181,951

[22] Filed: Apr. 15, 1988

[30] Foreign Application Priority Data

Apr. 15, 1987 [JP] Japan ................ 62-57288[U]
Apr. 15, 1987 [JP] Japan ................ 62-57290[U]
Apr. 15, 1987 [JP] Japan ................ 62-57291[U]

[51] Int. Cl.[5] ............. G11B 7/00; H01J 5/02; H01S 3/19
[52] U.S. Cl. ................ 369/44.11; 369/122; 372/36; 372/37; 250/239; 357/19
[58] Field of Search .......... 372/29, 36, 37, 43; 357/19, 74, 80; 250/239; 369/44–46, 110, 111, 120, 121, 122

[56] References Cited

U.S. PATENT DOCUMENTS

| | | | |
|---|---|---|---|
| 4,159,221 | 6/1979 | Schuessler | 357/80 X |
| 4,337,531 | 6/1982 | Willemsen | 369/112 X |
| 4,352,120 | 9/1982 | Kurihara et al. | 357/80 X |
| 4,650,285 | 3/1987 | Stevenson | 357/80 X |
| 4,686,678 | 8/1987 | Ohta et al. | 302/36 X |
| 4,752,109 | 6/1988 | Gordon et al. | 357/80 X |
| 4,757,197 | 7/1988 | Lee | 357/19 |
| 4,764,931 | 8/1988 | Matsuda | 372/29 |
| 4,768,070 | 8/1988 | Takizawa et al. | 372/36 X |
| 4,797,895 | 1/1989 | Kobubo et al. | 372/43 |

FOREIGN PATENT DOCUMENTS 55-130150 10/1980 Japan .
58-111387 7/1983 Japan ................ 372/43

OTHER PUBLICATIONS

Article by Mr. Shikama-vol. 58, No. 11, 1984, pp. 742-744.
Abstract of JP 55-130150 12/25/80.

Primary Examiner—Aristotelis M. Psitos
Attorney, Agent, or Firm—Sughrue, Mion, Zinn, Macpeak & Seas

[57] ABSTRACT

An optical pickup apparatus is disclosed which comprises an optical detector formed on a substrate for detecting light reflected by a recording medium, a pattern formed on the substrate, a first block on which the substrate is fixed, a first reference surface formed on the first block substantially in parallel with an optical axis of the light to be detected, a second block arranged to be movable so as to be adjusted in a plane perpendicular to the optical axis and to support the first block, a second reference surface formed on the second block so as to correspondingly contact with the first reference surface; and a relay substrate fixed on the second block and electrically connected to the pattern.

2 Claims, 4 Drawing Sheets

COMPACT OPTICAL PICKUP APPARATUS FOR OPTICAL DISK PLAYER

BACKGROUND OF THE INVENTION

The present invention relates to an optical pickup apparatus for use preferably in an optical video disk player, a compact disk player, an optical disk apparatus, or the like. According to the present invention, the optical detector is fixed on the first block, and the first block is supported by the second block. The second block is arranged to be movable for adjustment in a plane perpendicular to the optical axis of light to be detected, and the first block is arranged to be movable for adjustment relative to the second block along the optical axis.

FIG. 1 shows an arrangement of an optical detector in the conventional optical pickup apparatus. In the drawing, reference numeral 1 designates a condenser lens for converging light radiated upon a recording medium such as a disk or the like and reflected therefrom. The light converged by the condenser lens 1 is made to be incident onto an optical detector 3 such as a photodiode or the like. Lead frames 4 are attached to a molding 2 of the optical detector 3, and the output of the optical detector is read through bonding wires 7 (FIG. 3) and the lead frames 4. The reference numeral 5 designates a flexible substrate (including coated lead wires and the like ) with its one end connected to the lead frames 4 and the other end connected to a fixed relay substrate (not shown and including a circuit substrate). Thus, the output of the optical detector 3 is externally derived from the relay substrate.

In assembling, in order to make the center of the optical detector 3 coincident with the optical axis of the condenser lens 1, a fixing member (not shown) on which the optical detector 3 (the molding 2) is fixed is moved so as to be adjusted in the xy-plane perpendicular to the optical axis. After completion of the adjustment, the fixing member (the optical detector 3) is fixed on a supporting member 6. Thereafter, furthermore, the condenser lens 1 is moved for adjustment along the optical axis (the z-axis) thereof so as to form a suitable light spot on the optical detector 3. Alternatively, the adjustment along optical axis is performed by moving the supporting member 6 along the optical axis while guiding the supporting member 6 by a guide member 8 as shown in FIG. 2. The flexible substrate 5 which can be freely changed in shape is used so as to perform such movement for adjustment.

After completion of the adjustment, the condenser lens 1, the supporting member 6, and the like are fixed at predetermined positions with an adhesive or the like.

As described above, in the conventional apparatus, the molding 2 from which the lead frames 4 are projected so as to be connected at their one ends to the flexible substrate 5, is fixed to a predetermined fixing member which is arranged to be movable for adjustment in the xy-plane and to be movable for adjustment in the z-direction together with the supporting member 6. Therefore, the conventional apparatus has a disadvantage in that the fixing member, that is, the supporting member 6 cannot be reduced in shape, and therefore it is difficult to reduce the whole apparatus in size.

SUMMARY OF THE INVENTION

It is therefore an object of the present invention to provide an optical pickup apparatus further reduced in size.

The optical pickup apparatus according to the present invention comprises: an optical detector formed on a substrate for detecting light reflected by a recording medium; a pattern formed on the substrate; a first block on which the substrate is fixed; first reference surface means formed on the first block substantially in parallel with an optical axis of the light to be detected; a second block arranged to be movable so as to be adjusted in a plane perpendicular to the optical axis and to support the first block; second reference surface means formed on the second block so as to correspondingly contact with the first reference surface means; and a relay substrate fixed on the second block and electrically connected to the pattern.

The pattern and the optical detector for detecting light reflected by the recording medium are formed on the substrate which is fixed on the first block. The first block is supported by the second block. The first and second blocks have the mutually correspondingly contacting first and second reference surface means respectively. The first and second reference surface means are formed substantially in parallel with the optical axis of light to be detected. Therefore, the second block can be moved for adjustment in a plane perpendicular to the optical axis together with the first block, and the first block can be moved relative to the second block for adjustment along the optical axis. The second block is provided with the relay substrate fixed thereon which is electrically connected to the pattern.

According to the present invention, the optical pickup apparatus comprises: a semiconductor laser chip for generating and producing at least recording/reproducing laser light; an objective for focusing the recording/reproducing laser light on a recording medium; an optical detector for detecting reflection light from the recording medium; a housing for supporting the objective and the optical detector; a relay substrate fixed on the housing; and bonding wires electrically connecting the optical detector and the relay substrate to each other.

The semiconductor laser chip generates at least recording/reproducing laser light. The recording/reproducing light is focused on the recording medium through the objective, and the light reflected from the recording medium is detected by the optical detector. The objective and the optical detector are supported on the housing. Further, the relay substrate is fixed on the housing and connected to the optical detector through the bonding wires.

According to the present invention, the semiconductor laser chip supported on the stem of a non-magnetic material, the optical detector, and the objective are supported on the housing integrally with each other, and the housing is driven by an electromagnetic force.

According to the present invention, the optical pickup apparatus comprises: a semiconductor layer chip for radiating at least laser light for recording/reproducing; a stem of a non-magnetic material for supporting the semiconductor laser chip; an objective for focusing the laser light recording/reproducing onto a recording medium; an optical detector for detecting reflection light from the recording medium; a housing for supporting the stem, the objective, and the optical detector; a coil wound around the housing for performing focusing or tracking control; and a magnetic circuit for generating a magnetic field to be applied to the coil.

The semiconductor laser chip is arranged to generate at least recording/reproducing laser light. The semiconductor layer chip is supported on the stem of a nonmagnetic material. The recording/reproducing light is focused on the recording medium through the objective, and the light reflected from the recording medium is detected by the optical detector. The stem, the objective, and the optical detector are supported on the housing. The coil for performing focusing or tracking control is wound around the housing, and disposed in a magnetic field generated by the magnetic circuit. Therefore, when the focusing control is performed, the whole housing is driven.

DESCRIPTION OF THE PREFERRED EMBODIMENTS

Figure 1:
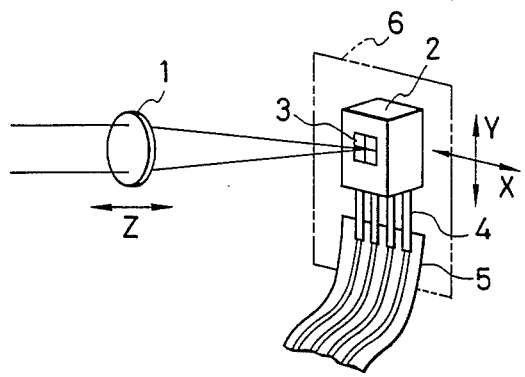
FIGS. 1 and 2 are perspective views showing the conventional optical detector.
Figure 2:
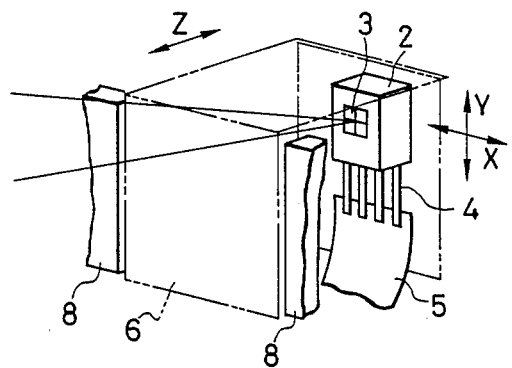
Figure 3:
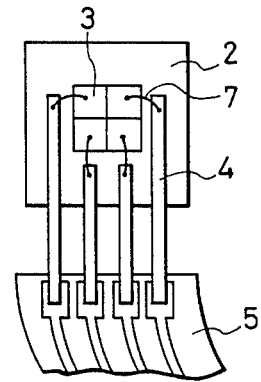
FIG. 3 is a plan view of the same.
Figure 4:
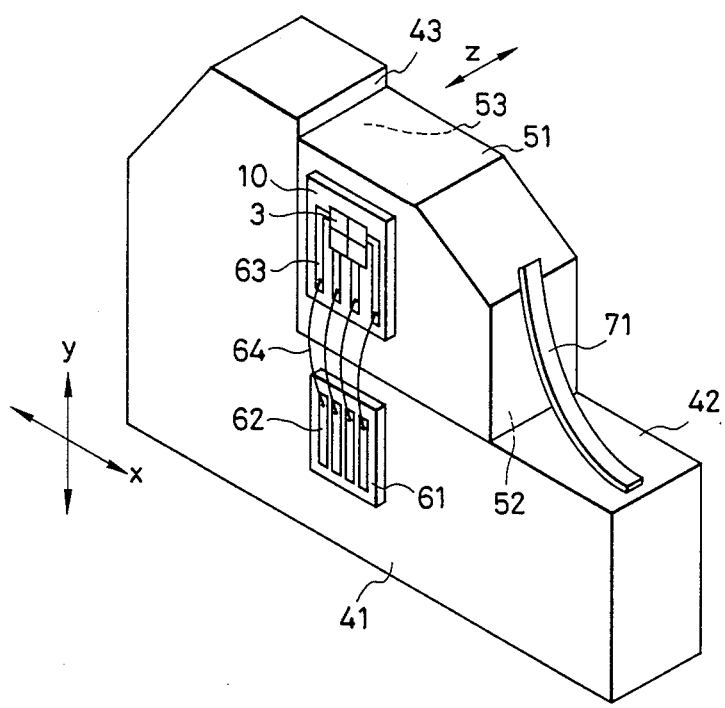
FIG. 4 is a perspective view showing the attachment structure of the optical detector according to the present invention.

FIG. 4 shows the support arrangement of the optical detector according to the present invention. In FIG. 1, parts corresponding to those in FIGS. 1 through 3 are correspondingly referenced. A substrate 10 having an optical detector 3 formed thereon is fixed on a front surface of a block 51. A lead pattern 63 is further formed on the substrate 10. Unlike the conventional apparatus, the substrate 10 having those foregoing members formed thereon, is not molded but left as it is in the form of a chip.

A relay substrate (including a circuit substrate) 61 having a pattern 62 is fixed on a front surface of a block 41. The pattern 62 and the lead pattern 63 are electrically connected to each other through bonding wires 64. A given member (not shown) is electrically connected to the patterns 62 so as to output a signal from the optical detector 3.

The block 51 has reference surfaces 52 and 53. Also the block 41 has reference surfaces 42 and 43 correspondingly contacting with the reference surfaces 52 and 53. Those reference surfaces are formed so as to be perpendicular to the x- and y-axis respectively. Therefore, the block 51 is made movable relative to the block 41 in the z-direction while being guided by the reference surfaces. The reference numeral 71 designates an urging member constituted by a plate spring, a wire, or the like, for urging the block 51 in the directions of the reference surfaces of the block 41.

In adjustment, the block 41 is moved in the xy-plane perpendicular to the optical axis (the z-axis) of light to be detected. At that time, the block 51 urged by the urging means 71 is moved together with the block 41 so that the center of the optical detector 3 can be made substantially coincident with the optical axis. After completion of the adjustment, the block 41 is fixed on a housing 26 (FIG. 7) with an adhesive or the like.

Next, the block 51 is moved for adjustment in the z-direction while being guided by the reference surfaces of the block 41. At that time, the block 51 is smoothly moved because it is urged by the urging means 71. Having moved to a position where a suitable light spot is formed on the optical detector 3, the block 51 is fixed on the block at that position with an adhesive or the like.

The movement for adjustment along the optical axis can easily be performed because the bonding wires 64 are easily changeable in shape.

Figure 5:
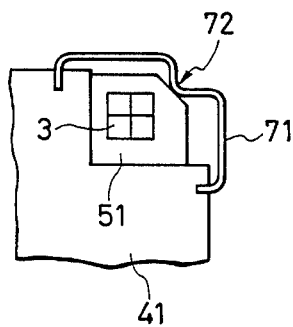
FIGS. 5 and 6 are front views showing the optical detector.
Figure 6:
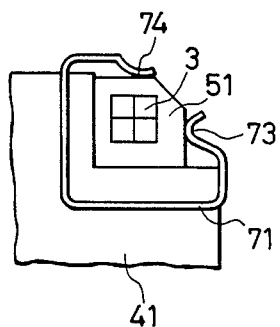

Urging of the block 51 may be performed in such a manner that the opposite ends of the urging means 71 are fixed in the block 41 and a central portion 72 of the urging means 71 is urged against the block 51 as shown in FIG. 5, or the central portion is fixed and each of the opposite end portions 73 and 74 are urged against the block 51 as shown in FIG. 6.

Figure 8A:
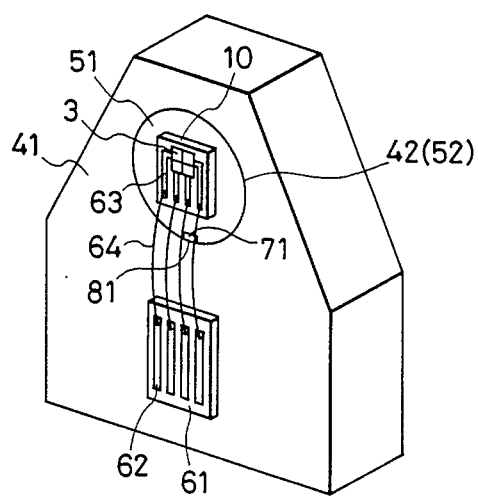
FIGS. 8A and 8B illustrate another embodiment of the present invention in a perspective view and in section, respectively.
Figure 8B:
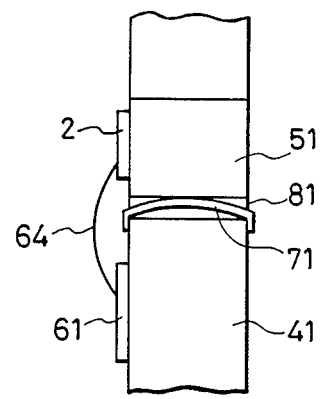

FIGS. 8A and 8B show another embodiment of the present invention. In this embodiment, blocks 41 and 51 have cylindrical reference surfaces 42 and 52 formed thereon respectively. The block 51 has a groove 81 formed therein so that an urging means 71 constituted by a plate spring or the like is fitted in the groove. Also in this case, the block 41 can be moved in the xy-plane, and the block 51 can be moved relative to the block 41 in the z-direction.

Figure 7:
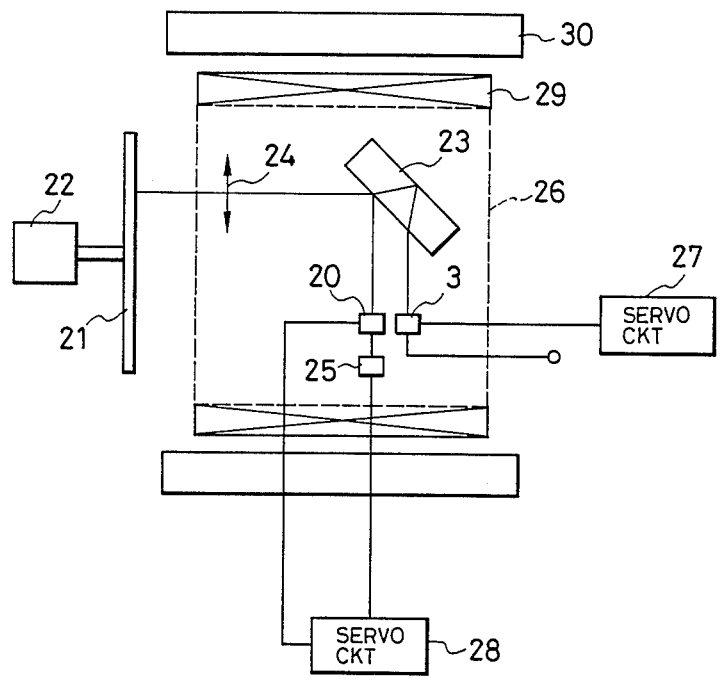
FIG. 7 is a block diagram showing the optical pickup apparatus according to the invention.

FIG. 7 is a block diagram showing the optical pickup apparatus according to the present invention. Monitor light emitted from a semiconductor laser chip 20 is detected by an optical detector 25. A servo circuit 28 is arranged to compare the output of the optical detector 25 with a predetermined reference value to thereby drive the semiconductor laser chip 20 correspondingly to an error detection signal obtained by the comparison. As a result, servo control is performed so as to make the level of output light from the semiconductor laser chip 20 constant.

Recording/reproducing light emitted from the semiconductor laser chip 20 is reflected by the front surface of a parallel flat plate 23 and made to be incident onto an objective 24. The objective 24 is arranged to focus the recording/reproducing light on a disk 21 used as a recording medium and rotated by a motor 22. In recording, the recording/reproducing light is modulated correspondingly to a recording signal, so that a predetermined signal is recorded on the disk 21.

Light reflected by the disk 21 is focused by the objective 24 onto the parallel flat plate 23. The light refracted in the surface of the parallel flat plate 23 and reflected by the rear surface of the same is refracted in the front surface of the parallel flat plate 23 again, and then made incident upon the optical detector 3 constituted by a photodiode or the like. In reproducing, since the output of the optical detector 3 charges correspondingly to the recorded signal on the disk 21, a reproduced signal is obtained from the output of the optical detector 3.

Being transmitted through the parallel flat plate 23, the light incident upon the optical detector 3 provides astigmatism. A servo circuit 27 produces a focus error signal in accordance with a so-called astigmatism method. The servo circuit 27 supplies a driving signal corresponding to the focus error signal to a coil 29 constituting an actuator so as to cause the actuator to control the position of the objective 24.

The coil 29 is wound around the housing 26 and disposed in a magnetic field generated by a magnetic circuit 30 constituting the actuator. The semiconductor laser chip 20, the optical detector 25, the parallel flat plate 23, the objective 24, the optical detector 3, and the relay substrate 11 are supported by the housing 26 integrally with each other. Therefore, the whole housing 26 is driven by an electromagnetic force corresponding to the focus error signal.

Further, a tracking coil (not shown) wound around the housing 26 is disposed in a tracking magnetic circuit so as to perform tracking control In the case where an optical system from the semiconductor laser chip 20 to the optical detector 3 is thus housed in the single housing 26 and the housing 26 itself is made to be a movable portion in a focus servo (or a tacking servo), it is necessary to reduce the movable portion in size as much as possible. The size reduction cannot be realized by the arrangement in which the lead frames 4 are projected from the molding 2 and the flexible substrate 5 is connected to the lead frames 4 but can be realized only by such an arrangement in which the lead pattern 63 is formed on the substrate 10 and connected to the relay substrate 61 through the bonding wires 64.

According to the present invention, the optical pickup apparatus comprises: an optical detector formed on a substrate for detecting light reflected by a recording medium; a pattern formed on the substrate; a first block on which the substrate is fixed; first reference surface means formed on the first block substantially in parallel with an optical axis of the light to be detected; a second block arranged to be movable so as to be adjusted in a plane perpendicular to the optical axis and to support the first block; second reference surface means formed on the second block so as to correspondingly contact with the first reference surface means; and a relay substrate fixed on the second block and electrically connected to the pattern. Therefore, the apparatus can be reduced in size.

Figure 9:
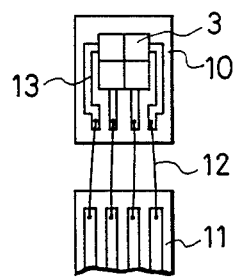
FIG. 9 is a plan view showing the optical detector according to another embodiment.

FIG. 9 is a plan view showing the optical detector according to another embodiment of the present invention. In FIG. 9, parts corresponding to those in FIGS. 1 through 3 are correspondingly referenced. According to the present invention, a lead pattern 13 is formed on a substrate 10 on which an optical detector 3 is formed. In the case where the optical detector 3 is divided into four parts so as to perform focusing control by astigmatism, the lead pattern 13 is formed of four parts corresponding to the divisional number of the former. The substrate 10 on which the foregoing members are formed is not molded but left as it is in the form of a chip. A relay substrate 11 (including a circuit substrate) is fixed on the housing, and the lead pattern 13 and the relay substrate 11 are electrically connected to each other through thin bonding wires 12. Therefore, the output of the optical detector 3 is externally read through the lead pattern 13, the bonding wires 12, and the relay substrate 11.

Figure 10:
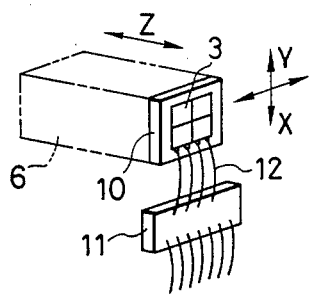
FIG. 10 is a perspective view of the same.
Figure 11:
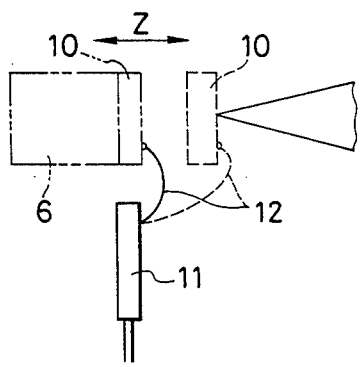
FIG. 11 is a side view of the same.

As shown in FIGS. 10 and 11, the substrate 10 is fixed on a supporting member 6. The whole of the supporting member 6 and a guide member (not shown) is moved along the x- and y-axes in the xy-plane so that the center of the optical detector 3 is adjusted to be substantially coincident with the optical axis.

Next, the supporting member 6 is moved for adjustment along the optical axis (the z-axis) while being guided by the guide member (not shown), and fixed at a position where a suitable light spot is formed.

In the adjustment, the substrate 10 (the optical detector 3) is moved in the z-direction, and the movement is hardly prevented because the bonding wires 12 can be freely changed in shape.

According to this embodiment, as described above, the optical pickup apparatus comprises: a semiconductor laser chip for generating and producing at least recording/reproducing laser light; an objective for focusing the recording/reproducing laser light on a recording medium; an optical detector for detecting reflection light from the recording medium; a housing for supporting the objective and the optical detector; a relay substrate fixed on the housing; and bonding wires electrically connecting the optical detector and the relay substrate to each other. Therefore, it is made possible to reduce the size of the apparatus.

A semiconductor laser chip is arranged to emit laser light in two directions. The laser light in one direction is used for recording/reproducing information on/from a recording medium, and the laser light in the other direction is used for monitoring an output level. An optical detector for detecting the monitor laser light is disposed in the vicinity of the semiconductor laser chip so as to detect the laser light before it is excessively diffused. Therefore, the semiconductor laser chip and the optical detector used for the monitoring are mounted on one and the same stem to thereby constitute a semiconductor laser apparatus.

In the conventional apparatus, the foregoing stem is made of an iron alloy which is a kind of magnetic material. Accordingly, the stem is disposed separately from the actuator for driving the objective by electromagnetic force, because the stem will be subject to attraction force owing to magnetism if it is disposed in the vicinity of the actuator. As a result, the apparatus has a disadvantage in that it cannot be reduced in size.

It is therefore another object of the present invention to make it possible to reduce the size of the apparatus by preventing the stem from being affected by magnetism.

Figure 12:
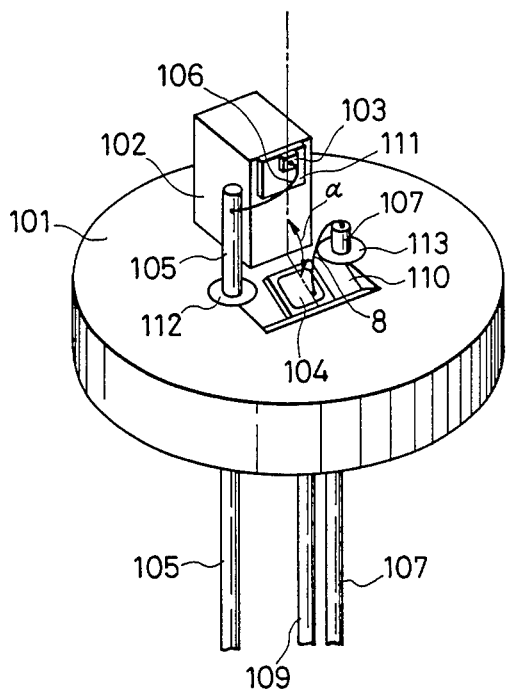
FIG. 12 is a block diagram showing the optical pickup apparatus according to the present invention.

FIG. 12 is a perspective view showing the semiconductor laser apparatus according to the present invention. The reference numeral 101 designates a stem of a non-magnetic material having high heat conductivity, the whole of the stem 101 being plated with high purity gold together with a heat sink 102 so as to facilitate bonding of a semiconductor laser chip 103 and the like. The semiconductor laser chip 103 is fixed on the heat sink 102 (through a silicon substrate 111, if necessary). The reference numeral 104 designates an optical detector constituted by a photodiode or the like for receiving monitor laser light emitted from the semiconductor laser chip 103, the optical detector being fixed on a recess portion 110 of the stem 101. The recess portion 110 is formed to have a predetermined angle α (for example, 100 through 110 degrees) relative to the semiconductor laser chip 103 so that the monitor laser light is not reflected by the optical detector 104 and not returned to the semiconductor laser chip 103. Lead pins 105, 107, and 109 are buried in the stem 101. Predetermined electric power is supplied to the semiconductor laser chip 103 through the lead pin 105 and a wire 106. Further, the output of the optical detector 104 is externally supplied through a wire 108 and the lead pin 107. The lead pin 109 serves as a common electrode. The reference numerals 112 and 113 designate glass for fixing the lead pins 105 and 107 onto the stem 101 and for insulating them from the stem 101.

Those lead pins 105, 107, and 109 are welded on the stem 101 through the glass 112 and 113 or the like, and therefore the stem 101 is formed, for example, by an alloy of copper and tungsten or the like (a non-magnetic material) having the same coefficient of thermal expansion with the glass. Further, if the sticking and insulating are performed by any other predetermined adhesive, it is possible to use, for example, brass as a material for the stem 101.

If the actuator is constituted by, for example, a piezo-electric element or the like, it is not necessary to form the stem by a non-magnetic material. The piezo-electric element, however, has a problem in that not only a high-voltage driving circuit is required, but the response is low. To solve the problem, not only the arrangement is complicated but the cost is high. Therefore, the electromagnetically driven system according to the present invention is preferable in practical use.

As described above, according to the present invention the optical pickup apparatus comprises: a semiconductor laser chip for radiating at least laser light for recording/reproducing; a stem of a non-magnetic material for supporting the semiconductor leaser chip; an objective for focusing the laser light recording/reproducing onto a recording medium; an optical detector for detecting reflection light from the recording medium; a housing for supporting the stem, the objective, and the optical detector; a coil wound around the housing for performing focusing or tracking control; and a magnetic circuit for generating a magnetic field to be applied to the coil.

Therefore, the stem is prevented from being affected by the electromagnetic force of the actuator to thereby make it possible to reduce the size of the apparatus.

What is claimed is:

1. An optical pickup apparatus comprising: an optical detector formed on a substrate for detecting light reflected by a recording medium; a pattern formed on said substrate; a first block on which said substrate is fixed; first reference surface means formed on said first block substantially in parallel with an optical axis of said light to be detected; a second block arranged to be movable so as to be adjusted in a plane perpendicular to said optical axis and to support said first block; second reference surface means formed on said second block so as to correspondingly contact with said first reference surface means; and a relay substrate fixed on said second block and electrically connected to said pattern.

2. An optical pickup apparatus comprising: a semiconductor laser chip for generating and producing at least recording/reproducing laser light; an objective for focusing said recording/reproducing laser light on a recording medium; an optical detector for detecting reflection light from said recording medium; a housing for supporting said objective and said optical detector; a relay substrate fixed on said housing; and bonding wires electrically connecting said optical detector and said relay substrate to each other.

* * * * *